United States Patent [19] | [11] Patent Number: 4,731,904
Sprague | [45] Date of Patent: Mar. 22, 1988

[54] SPRING SYSTEM FOR STABILIZING BIFOLD DOOR HINGED POSITIONS

[76] Inventor: George W. Sprague, 1744 Ellingwood Rd., Baltimore, Md. 21237

[21] Appl. No.: 72,521

[22] Filed: Jul. 13, 1987

[51] Int. Cl.[4] .................. E05F 1/08; F16F 1/00

[52] U.S. Cl. .................. 16/286; 16/291; 16/DIG. 36; 267/74

[58] Field of Search .................. 16/286, 291, 293, 295, 16/304, DIG. 36; 267/150, 73, 74

[56] References Cited

U.S. PATENT DOCUMENTS

| | | | |
|---|---|---|---|
| 515,334 | 2/1894 | Held | 16/293 |
| 577,593 | 2/1897 | Bronson | 16/293 |
| 2,290,219 | 7/1942 | Ulfving | 16/291 |
| 2,541,377 | 2/1951 | Neely | 16/293 |
| 2,998,618 | 9/1961 | Roy | 16/293 |
| 4,452,372 | 6/1984 | Pearce | 16/291 |

FOREIGN PATENT DOCUMENTS

| | | | |
|---|---|---|---|
| 931710 | 8/1955 | Fed. Rep. of Germany | 16/291 |

*Primary Examiner*—Nicholas P. Godici
*Assistant Examiner*—Edward Brown
*Attorney, Agent, or Firm*—John F. McClellan, Sr.

[57] ABSTRACT

A spring system for stabilizing bifolding door hinged positions includes an integral "C"-shaped spring with at each end of the "C"-shape a respective straight shank formed at right angles to the plane of the "C"-shape in parallel spacing from each other. On each shank is a rotatable tubular sleeve bearing with a collar-shaped enlargement at the end adjacent the "C"-shape, and a retainer on the free end of each shank that keeps the tubular sleeve bearings in place. Installation is by insertion of the tubular sleeve bearings in parallel-spaced drilled holes in the top edges of two doors that are hinged together so that the spring assembly substantially bridges the hinges and biases the faces of the doors together to keep them in the open position, and biases the edges of the doors together to keep them in the closed position.

7 Claims, 6 Drawing Figures

SPRING SYSTEM FOR STABILIZING BIFOLD DOOR HINGED POSITIONS

FIELD OF THE INVENTION

This invention relates generally to door hardware and specifically to a spring for stabilizing bi-fold doors in the open position or in the closed position.

BACKGROUND OF THE INVENTION

Complex or compound type springs have been proposed for holding bi-fold doors in the closed position or in the open position, and with two stable positions are known for use with box lids and the like.

U.S. Pat. No. 3,849,835 issued on Nov. 26, 1974 to Torsti T. T. Jerila shows one of the complex type; examples of other such hinges are shown in the following U.S. Pat. Nos.:

- 2,290,219 to S. E. H. Ulfving, 7-21-42, shows the principle of multi-position (in this case 3-way) stability;
- 515,334 issued to A. S. Held on 2-27-1894, shows a hinge form having an arcuate portion and cross arms;
- 2,541,377 issued to G. W. Neely on 2-13-51, shows a hinge-related spring assembly that snaps doors open and closed at positions 180° apart;
- 2,998,618 issued to L. T. Roy on 9-3-61, shows another arcuate spring arrangement for hinged closures;
- 4,452,373 issued to D. J. and R. J. Pearce on 6-5-84, showed another form of "C"-shaped spring and engagement with pivoted closure.

SUMMARY OF THE INVENTION

However, it is believed that no spring like that of the present invention has been known or provided the combination of ease of installation with simplicity of mechanism and quiet and efficient operation, all in accordance with these and other objects of this invention, which include provision of a bifold door spring that:

- is suited for wood or for metal doors;
- is compact so that the exposed portion of it can lie between the top of the door and almost any header;
- extends little or not at all beyond the thickness of the door in any position of use;
- requires a minimum of installation work, normally only laying out of two holes to generous tolerances, drilling same parallel with each other, and inserting the spring assembly ends in the holes;
- tends to self-align in use even though not perfectly installed;
- is longwearing and protects wooden doors from mounting-hole enlargement due to wear over periods of time;
- is independent of, but acts in conjunction with bifold door hinges;
- is light weight and economical, and that is versatile and size-adaptable to suit most bifold doors.

Said another way, a spring system for stabilizing bifolding door hinged positions includes an integral "C"-shaped spring with at each end of the "C"-shape a respective straight shank formed at right angles to the plane of the "C"-shape with the shanks parallel-spaced from each other. On each shank is a rotatable tubular sleeve-bearing with a collar-shaped enlargement at the end adjacent the "C"-shape, and a retainer on the free end of each shank that keeps the tubular sleeve bearings in place. Installation is by insertion of the tubular sleeve bearings in parallel-spaced drilled holes in the top edges of two doors that are hinged together so that the spring assembly has three stable positions; (1) it substantially bridges the hinges and biases the faces of the doors together to keep the doors aligned in the fully open position; (2) it biases the edges of the doors together to keep the doors aligned in the fully closed position; and (3) it keeps the doors stable at a partially open intermediate position at which the axis of hinging between the doors is aligned with and between the spring assembly shanks.

The above and other objects and advantages of this invention will become more readily apparent on examination of the following description, including the drawings in which like reference numerals refer to like parts.

DETAILED DESCRIPTION

Figure 1:
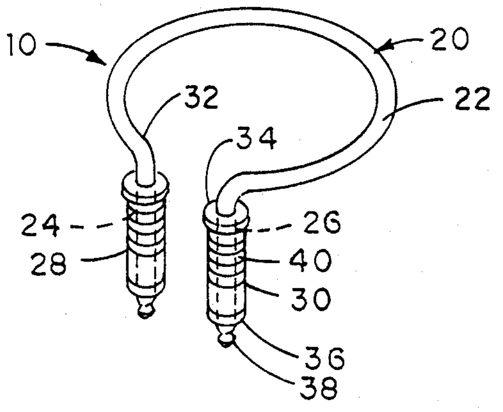
FIG. 1 is a perspective view of the preferred embodiment 10 of the spring assembly of this invention.

FIG. 1 shows preferred embodiment 10 of the invention. A piece of spring tempered, preferably circular cross-section wire 20 forms in plan view a "C"-shape 22 or spring loop. The "C"-shape terminates on each end in a respective straight shank 24, 26 at right angles about a radiused portion or bend to the plane of the "C"-shape, the shanks being parallel-spaced and co-extensive.

On each of the straight shanks 24, 26, a respective rotatable tubular bearing 28, 30 extends from the radiused bend 32 at the "C"-shape where the bearing has an integral, enlarged collar 34, to a retainer 36 at the free end 38 of the shank.

Each bearing has a series of circular grooves 40 on the outer surface that act as glue retainers, as will be seen.

Figure 2:
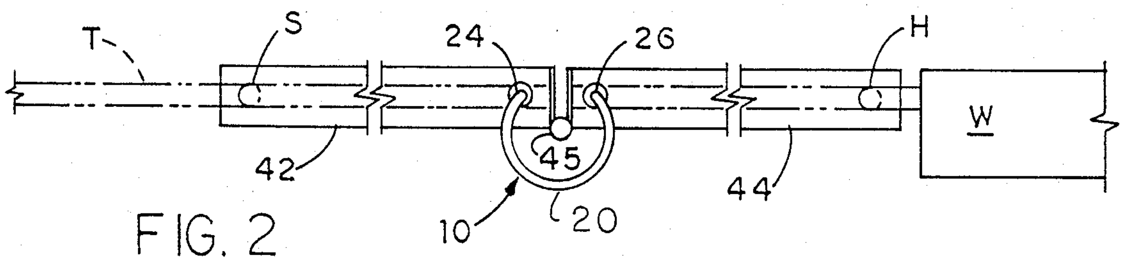
FIG. 2 is a top edge view of the invention installed in a bifold (and holding the doors closed) door system.

FIG. 2 shows coaction of assembly with spring 20 in the embodiment 10 holding closed vertically hinged-together bifold doors 42, 44. Over-center relation of the shank-ends 24, 26 in the spring assembly 10 relative to the axis of hinge 45 joining the doors, keeps the doors tightly closed. The doors are conventionally hinged to a closet wall W; a fixed pivot or hinge pin is represented at H. Conventional track T along the doors and shown in broken lines for exposition is engaged by conventional sliding hinge S on the door 42.

Figure 3:
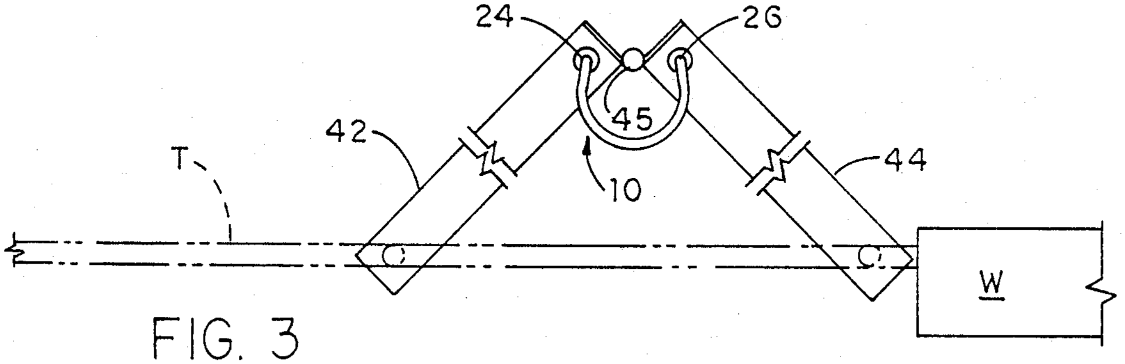
FIG. 3 is a view like that of FIG. 2 but with the spring assembly holding the bifold doors in half-open position.

FIG. 3 shows the spring assembly holding the doors 42, 44 in half-open position; in-plane alignment of the shanks 24, 26 with axis of the hinge 45 stabilizes the doors in this position.

Figure 4:
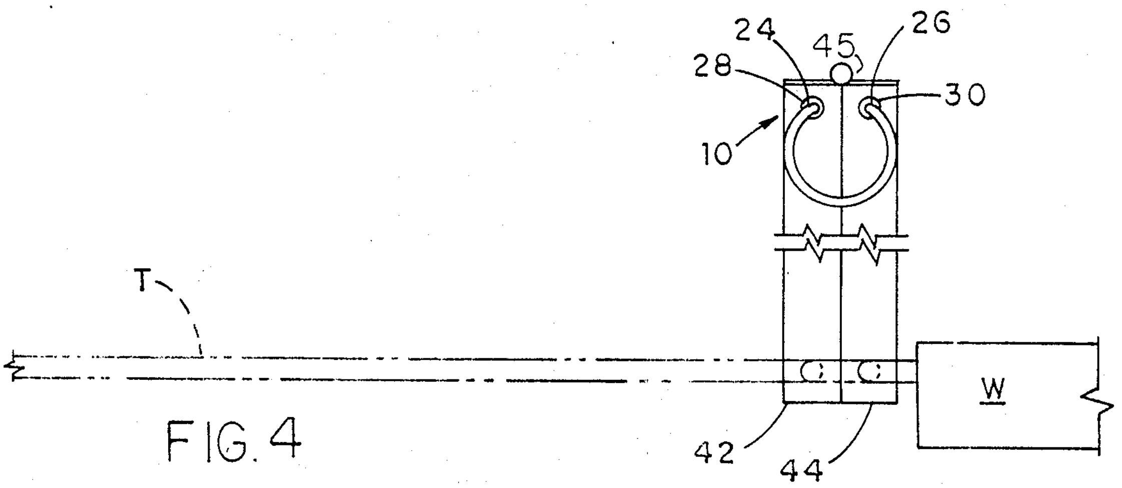
FIG. 4 is a view like that of FIG. 3 with the doors held open fully.

FIG. 4 shows the doors 42, 44 similarly stabilized in the open position by over-center relation of the shank ends 24, 26 to the axis of hinge 45. The door assemblies may be of any conventional type, conventionally hinged together as indicated at the door edges, and slidable on the track T, from which they depend.

Installation of the spring assemblies requires only that the holes for each pair of the bearings 28, 30 at the shanks 24, 26 be similarly drilled, one in each door at the hinge end, and sufficiently far from the projected hinge axis to flex the spring enough to press the faces or the edges of doors together as indicated.

Preferably each hole for a bearing should lie on the lower centerline of a door in a respective plane diagonally in the door from the hinge axis at about a 30° to 45° angle, so that it is directly in-plane with the hinge axis when the doors are half open. This provides for the over-center action to produce the two (open, closed) stable positions, and the third or half open stable position in which the spring is flexed more than in the others. Pre-load of the spring is easily set by increasing or decreasing the closed-door distance between the holes (as in FIG. 2) for the shanks at time of drilling.

Figure 5:
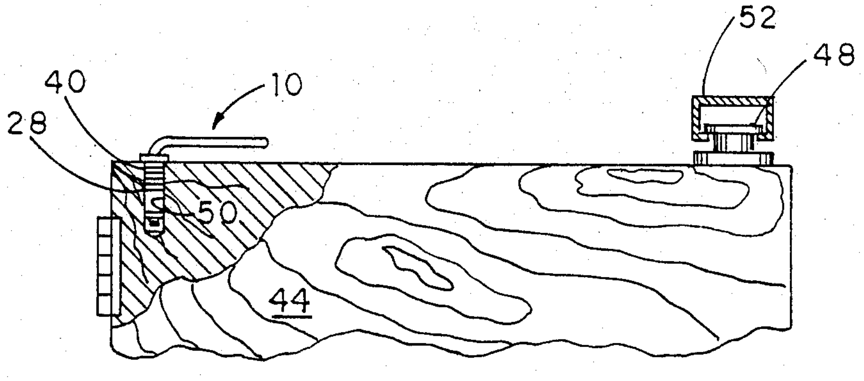
FIG. 5 is a face view of a door partially broken away to show side elevational installation detail of a spring assembly.

FIG. 5 shows a spring assembly 10 installed in a bifolding door panel 44, shown partially broken away for exposition and having, as an example, support by a conventional hinged hanger 48 and track 52, as previously described.

Each bearing (28 shown) is held by interference fit in a respective hole 50 drilled in the door and retained further if desired by cement in the grooves 40 on the bearing.

Figure 6:
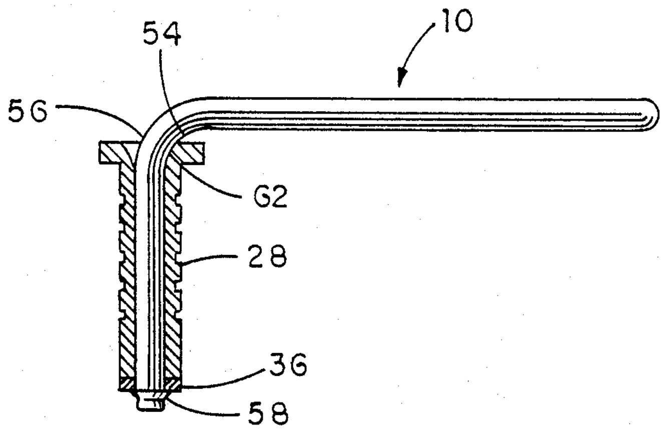
FIG. 6 is a side elevational view on a larger scale of a spring assembly showing retention details.

FIG. 6 shows further important advantages of the hinge assembly. The radius at 54 of the bend 56 and an upset end 58 with washer 36 capture and retain between them the rotatable anti-friction means or bearing (28 shown), which has in the collar end of the bore an internal radius at 62 matching the bend radius 54, for smooth operation.

It will be seen therefore that this invention provides great convenience in installation, prevents damage to doors on which installed, adds practically no mass to the doors, is easily inspected and insofar as can be seen, is decorative.

Further, it is clear that the springs will have no tendency to pinch fingers or damage anything they may come in contact with and that they will always keep in normal alignment under conditions of wear and tear that except for the bearing provisions might loosen them.

This invention is not to be construed as limited to the particular forms disclosed herein, since these are to be regarded as illustrative rather than restrictive. It is, therefore, to be understood that the invention may be practiced within the scope of the claims otherwise than as specifically described. For example, it will be appreciated that one having ordinary skill in the art can install the invention without inventive modification in a trifold door assembly.

What is claimed and desired to be protected by United States letters patent is:

1. A spring system for stabilizing at open and shut angular positions a pair of bifold doors hinged together at an edge of each said door about a vertical axis, comprising: tubular structure defining a respective hole and mountable in an edge of each said door substantially equidistant from and parallel to the vertical axis, a "C"-shape spring with first and second integral end portions in the form of a pair of parallel-spaced coextensive shanks extending at right angles from the plane of the "C"-shape, each of said shanks being located in the hole of a respective tubular structure, said spring being preloaded upon installation for exerting an over center force stabilizing the bifold doors by establishing the distance between the holes at any said angular position to be greater than said parallel spacing.

2. A spring system as recited, wherein in claim 1, said tubular structure comprises rotatable anti-friction means on each shank, and means for retaining the rotatable anti-friction means on the shanks.

3. A spring system as recited in claim 2, the means for retaining said rotatable anti-friction means comprising each shank having a substantial bend-radius at said right angle, each rotatable anti-friction means comprising an elongate member with a bore portion having at one end a radius fitting said bend radius, each shank having a washer on an extreme end thereof, and the extreme end enlarged for retaining said washer.

4. A spring system as recited in claim 3, the elongate member having an integral collar thereon and said bore portion radius extending into said integral collar.

5. A spring system as recited in claim 2, and means for holding the rotatable anti-friction means in said door comprising the anti-friction means having groove structure therearound along the length thereof acting as glue retainers.

6. A spring system for stabilizing at two angular positions the relation of a plurality of bifold type doors hinged together for opening and closing about vertical axes lying in a plane of said doors, and each door having a top edge with a hole vertically in the top edge adjacent to and symmetrically disposed relative to a said vertical axis, comprising: a "C"-shaped loop of spring-tempered wire with first and second ends downturned and forming respective straight shanks coextensively parallel with each other and at right angles to the plane of the "C"-shape, anti-friction means on each straight shank, means for retaining the anti-friction means on the straight shanks, and means for holding a respective one of said anti-friction means in each said hole, with each "C"-shape extending between two doors.

7. A spring system as recited in claim 6, the means for retaining the anti-friction means comprising: said wire at the location of said downturn having a first substantial radius of bend and the anti-friction means having a tubular shape with a straight bore and with the straight shank therein, and having also a radius at the end of said bore, matching the radius of bend of said downturn.

* * * * *